Figure 1:
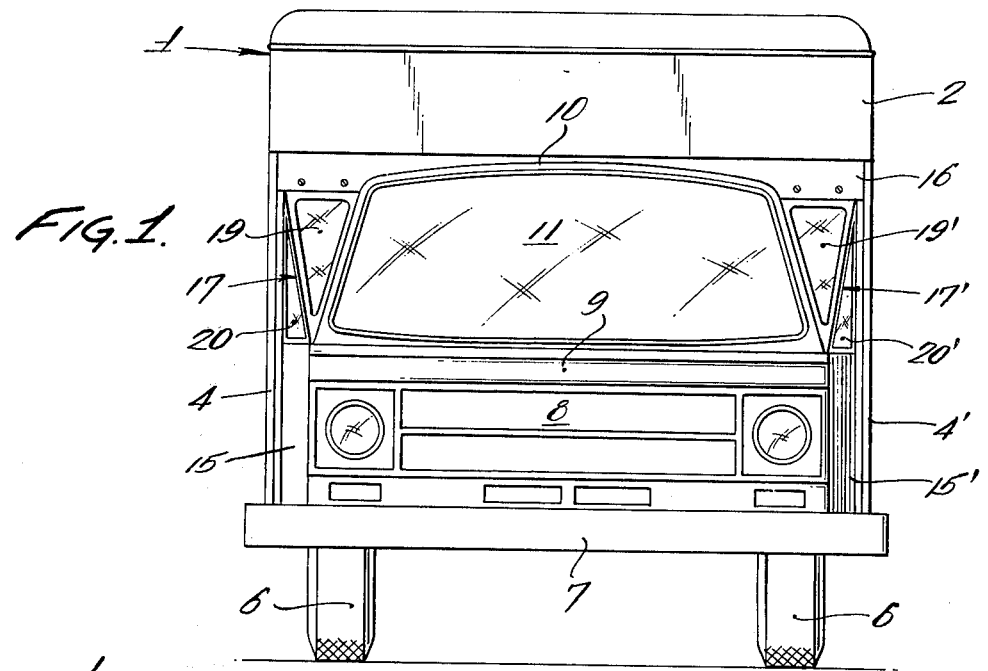

United States Patent [19]

Hafer

[11] 4,043,586

[45] Aug. 23, 1977

[54] FLOATING WINDOW ASSEMBLY FOR VEHICLES

[75] Inventor: Paul R. Hafer, Boyertown, Pa.

[73] Assignee: Boyertown Auto Body Works, Boyertown, Pa.

[21] Appl. No.: 652,509

[22] Filed: Jan. 26, 1976

[51] Int. Cl.² ............................................. B60J 1/10
[52] U.S. Cl. ........................................ 296/84 C; 52/208
[58] Field of Search ............... 52/403, 397, 400, 395, 52/208; 296/28 R, 28 C, 28 M, 28 K, 29, 35, 148, 152, 84 C

[56] References Cited

U.S. PATENT DOCUMENTS

| | | | |
|---|---|---|---|
| 2,805,097 | 9/1957 | Barber | 52/208 |
| 2,808,355 | 10/1957 | Christie | 52/208 |
| 2,989,338 | 6/1961 | Hezler | 52/208 |

Primary Examiner—Philip Goodman
Attorney, Agent, or Firm—Hyde W. Ballard

[57] ABSTRACT

This invention relates to a unitary window assembly for vehicles and particularly to a frame or sash for resiliently supporting one or more windows in the areas between the windshield and the cab of the vehicle.

2 Claims, 5 Drawing Figures

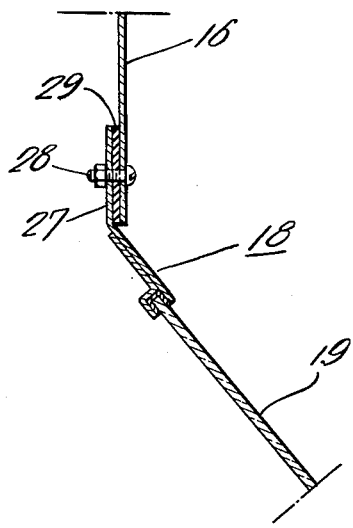
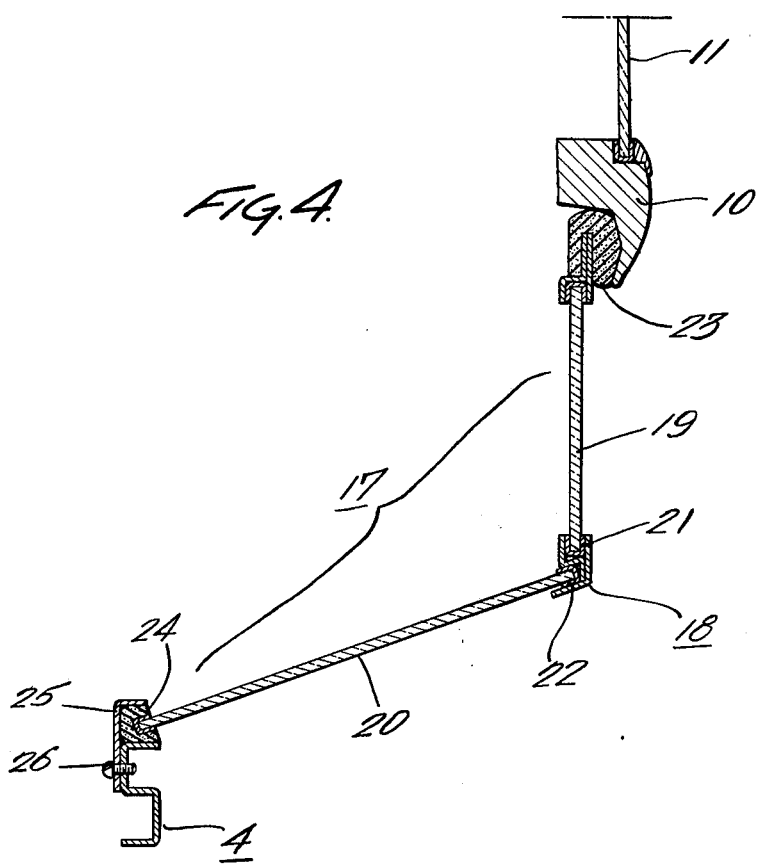
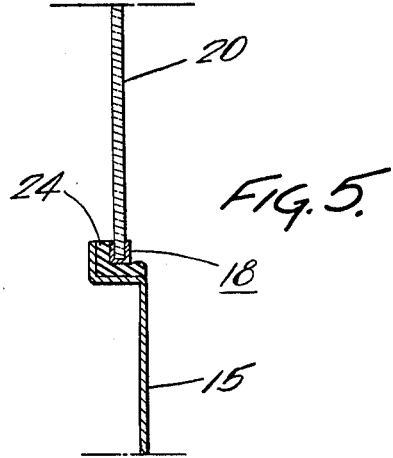

FLOATING WINDOW ASSEMBLY FOR VEHICLES

BACKGROUND OF THE INVENTION

In current practice the automotive manufacturer produces commercial bodies only of the types that can be sold in such large quantities as to warrant mass production. Special body types in limited numbers or orders for larger numbers of highly specialized bodies are usually filled by independent vehicle body builders. Examples of such types are those used by the military and postal services. The chassis manufacturer supplies the running gear, steering assembly, and the cab. The body manufacturer obtains an order or contract to build and install a specified body for the designated chassis. It is therefore a substantial problem to connect the forward portion of the body to the already fabricated cab in a satisfactory manner. Not only must this section be weather tight, but it must also have maximum visibility, low cost, and ease of installation. Curved glass sections are expensive and unless large volume production is needed, the cost may be prohibitive. In addition, it is important that limited movement between the body and the cab sections does not rupture the glass nor the seal.

OBJECTS OF THE INVENTION

It is therefore a primary object of the invention to provide a unitary floating section for joining two independent sections of a vehicle. More specifically, it is an object of the invention to provide a unitary sub-assembly of two or more flat transparent panes mounted in a frame which is in turn resiliently secured between the windshield and the body of a commercial vehicle, such as a van. Further objects will be apparent from the specification and drawings.

Figure 2:
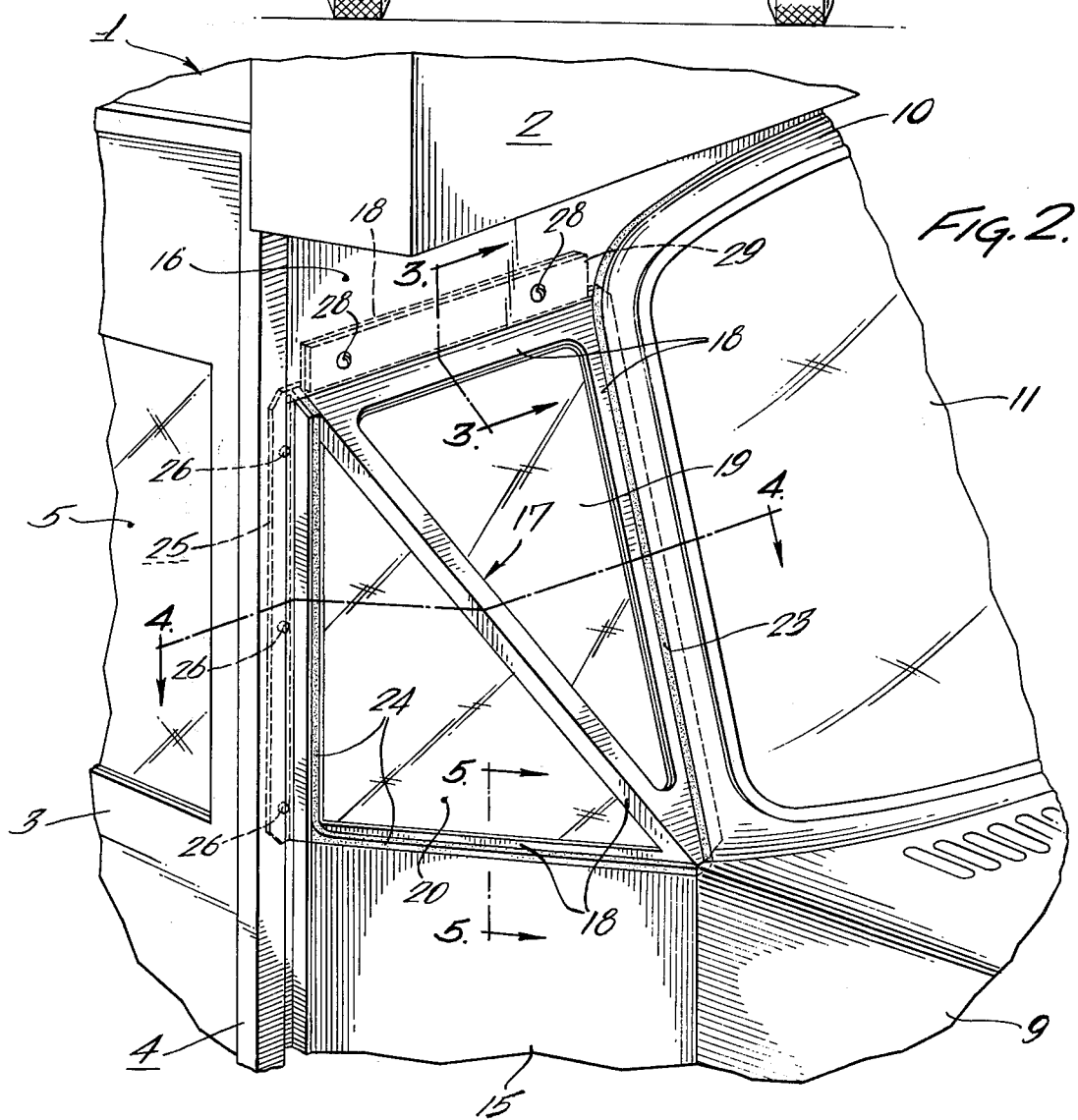

IN THE DRAWINGS,

FIG. 1 is a front elevation of a van equipped with the present invention,

FIG. 2 is an enlarged detail of the van of FIG. 1 showing the right side of the van, FIG. 3 is a section on the line 3—3 of FIG. 2, FIG. 4 is a section on the line 4—4 of FIG. 2, and FIG. 5 is a section on the line 5—5 of FIG. 2.

Referring now more particularly to the drawings, a vehicle especially adapted to utilize the invention is a self-propelled truck equipped with a van body. It will be understood that the invention may be used on other objects or vehicles in which a non-rigid but weather tight connection is needed. The truck shown herein has a van body 1 equipped with a transom 2 and door 3 hinged or latched to a vertical door post 4. The door 3 has the customary window 5 and desirably may be sliding as well as hinged.

The chassis as customarily supplied by the manufacturer has wheels 6, 6 bumper 7, grille 8, hood 9, and a windshield frame 10 holding a curved glass or plastic transparent windshield 11. The chassis is also provided with the usual steering apparatus, motor, etc. (not shown). The vertical panels 15, 15' connect the hood 9 to the door post 4 below the area of the windshield. Likewise a generally flat panel 16 connects and seals the transom 2 with the windshield frame 10.

The areas at each side of the windshield frame 10 are sealed with a sub-assembly 17 which comprises a dual plane framework 18 having two triangular apertures for supporting transparent windows 19 and 20. Each of the windows 19 and 20 is held in the framework 18 by suitable non-metallic channels 21 and 22 (FIG. 4) of the type customarily used for this purpose. The channels 21 and 22 may be of an elastomeric material or an elastomeric impregnated fabric.

The entire sub-assembly 17 is resiliently mounted to the van body 1 and the windshield frame 10 in relatively thick elastomeric channels 23 and 24. The lower portion of frame 18 is mounted at the top of panel 15, the rear vertical portion is secured to door post 4 by means of a flanged plate 25 (FIG. 4) removably fastened to the door post 4 by screws 26, 26. The upper portion of frame 18 is extended at an angle to provide a fastening flange 27 which is likewise removably secured to panel 16 under transom 2 by bolts 28, 28. A resilient strip 29 of elastomeric material is compressed between the flange 27 and the panel 16 to provide the floating connection across the top of frame 18. The fourth side of the frame 18 is sealably pressed against the windshield frame 10 by means of the irregularly shaped elastomeric channel 23 (FIG. 4).

It will be understood that there are shown two similar but allochiral sub-assemblies, one for the right side of the vehicle and one for the left side. FIG. 2 shows the right assembly 17, and the left assembly insofar as visible in FIG. 1 has been given corresponding primed reference numerals.

The present invention provides an inexpensive and satisfactory structure for connecting a prefabricated windshield frame to a standard van body produced by a body manufacturer rather than the chassis manufacturer. The dimensions and shape of the sub-assembly can be readily modified to accept varying sizes and shapes without the necessity for utilizing expensive dies. Maximum driver visibility is achieved without the necessity for curved or specially shaped glass or plastic windows since each pane is flat and of a simple triangular shape. Each sub-assembly is resiliently mounted to absorb any shocks or relative movement between the van and the prefabricated elements of the chassis, as well as to provide a weather tight seal. In addition, the sub-assemblies can be quickly detached for repair or replacement.

Having thus described my invention, I claim:

1. In a commercial vehicle such as a truck or a van the combination which comprises a chassis having a windshield, a non-integral body mounted on said chassis, a sub-assembly connecting the windshield to a transom on said body and a door post of said body, said sub-assembly having a frame, a relatively thick resilient seal in which the frame is mounted to provide a weather tight seal to permit limited relative movement of the frame, two transparent panes mounted in resilient seals secured to the frame said frame being removably secured to the door post of the body and the transom by fastening means clamping said frame to the door post and transom through strips of elastomeric material.

2. A vehicle in accordance with claim 1 in which two allochiral sub-assemblies are mounted on each side of the windshield.

* * * * *